W. A. Donnell.
Seed Planter.
No. 86,288. Patented Jan. 26, 1869.
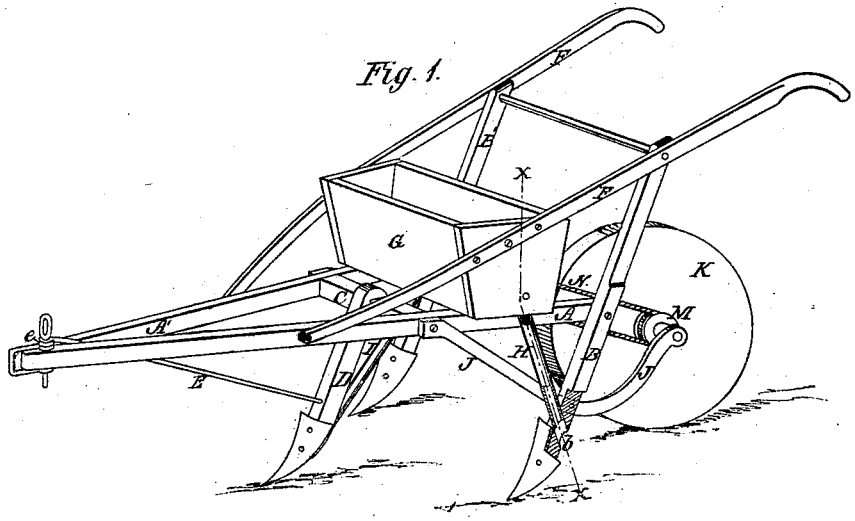
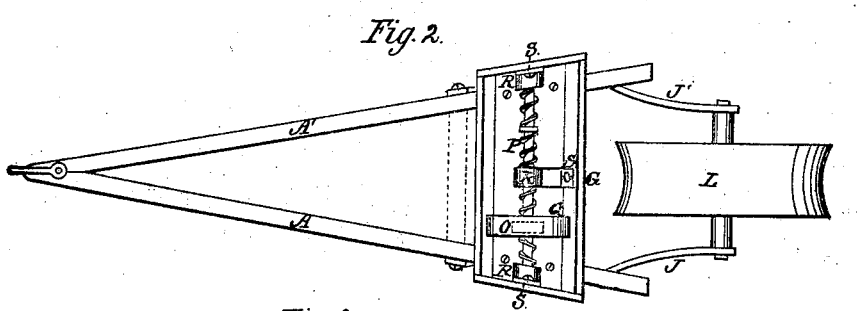
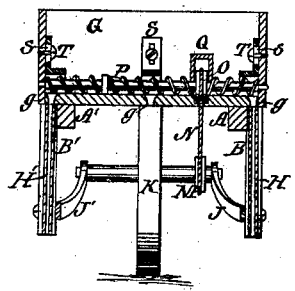
Witnesses,
Jas. A. Layman
Sam. Knight
Inventor:
W. A. Donnell
By Knight Bros
Attys.

WILLIAM A. DONNELL, OF GREENSBURG, INDIANA.

Letters Patent No. 86,288, dated January 26, 1869.

IMPROVEMENT IN SEED-DRILL AND CORN-COVERER.

The Schedule referred to in these Letters Patent and making part of the same.

*To whom it may concern:*

Be it known that I, WILLIAM A. DONNELL, of Greensburg, Decatur county, Indiana, have invented a new and useful Seed-Drill and Corn-Coverer; and I hereby declare the following to be a full, clear, and exact description thereof, reference being had to the accompanying drawings, making part of this specification.

This invention relates to a machine which is applicable to sowing small grain, and also to covering corn after the same has been dropped.

Figure 1 is a perspective view of the machine in condition of a wheat-drill.

Figure 2 is a plan, showing the concave-faced pressure-roller attached.

Figure 3 is a transverse section on the line $x-x$, fig. 1.

A A' constitute an angular frame, to whose forward end the draught-clevis is attached, and whose rear ends are secured to the outer standards B B'.

C is a cross-bar, to whose mid-length the central (and forward) standard D is attached.

The brace-bar E of this standard has, at its forward end, an eye, $e$, through which the clevis-bolt passes.

Attached to the frame A A', and also to the handles F, is a seed-hopper, G, and from the bottom of the said hopper descend seed-conductors H H' I, the two former of which pass downward through the standards B B', and deposit the seed at the rear side of said standards, in near proximity to the ground.

The aperture $b$, through the standard, is so situated as to render any clogging of the same by the earth impossible; and yet to deliver the seed very accurately in the furrow made for its reception.

The conductor, I, does not pass through the standard D, but delivers the seed at the same relative point in the rear of the same as the conductors H H', namely, in the immediate rear of the lower portion of the standard.

Proceeding from the sides of the frame A A' are two metallic bars, J J', which, tending downward and backward, are attached to the standards B B', forming braces therefor, and are further extended backward to form journal-bearings for the axle of the ground-wheel K, or concave-faced roller L, as the machine may be respectively used as a wheat-drill or corn-coverer.

When the implement is used as a drill, the wheel K supports its rear end at the desired height, and the axle of this wheel carries a rag-wheel or pulley, M, carrying a chain or belt, N, as the case may be, and the chain or belt also passes around a similar wheel or pulley, O, upon the auger feed-shaft P, in the lower part of the seed-hopper G.

The contact of the seed against the pulley O, and the escape of the seed through the apertures traversed by the belt, are prevented by a covering-box, Q, whose edges are made to fit the bottom and sides of the hopper.

The amount of seed sown is regulated by semi-cylindrical plates, R, which cover the feed-screw P above the apertures $g$, through which the seed escapes from the hopper.

The said plates R are secured to the hopper by upward extensions, S, which have slots, $s$, through which pass attachment-screws, T, and the said screws being loosened, the plates may be adjusted, to allow the passage of more or less grain, as stated.

The amount of seed sown may be also regulated by the speed of the rotation of the feed-shaft.

When used as a grain-drill, the implement is as seen in fig. 1, and will, by the use of a single horse, drill in three rows of grain at each "through."

When used to cover corn, the forward standard, I, is removed, (its brace-rod being easily disengaged from the clevis-bolt, as before stated,) and the belt or chain being thrown off the pulley M, the ground-wheel K, with its axle, is removed, and the concave-faced roller L substituted therefor. In this form, it will be understood that the horse walks in the furrow into which the corn has been dropped, and the plows throw the earth therein, which is then pressed down upon the seed by the roller L, which leaves it nicely rounded up, and snugly tucked in to the corn.

The implement may be used as a cultivator, when in the drill-form, by merely throwing off the belt N.

I claim herein as new, and of my invention—

The arrangement and combination of the feed-shaft P, the pulley O, and cover Q, the belt, cord, or chain N, the pulley M, the seed-conductors H H' I, the braces J J', the plate R, furnished with the extensions S, when constructed and arranged substantially as and for the purposes set forth.

In testimony of which invention, I hereunto set my hand.

W. A. DONNELL.

Witnesses:
GEO. H. KNIGHT,
JAMES H. LAYMAN.